(12) United States Patent
Shi et al.

(10) Patent No.: US 9,313,704 B2
(45) Date of Patent: Apr. 12, 2016

(54) METHOD, DEVICE AND SYSTEM FOR CONTROLLING UE TO TAKE MEASUREMENTS

(75) Inventors: Lirong Shi, Shenzhen (CN); Meifang He, Shenzhen (CN)

(73) Assignee: ZTE CORPORATION (CN)

( * ) Notice: Subject to any disclaimer, the term of this patent is extended or adjusted under 35 U.S.C. 154(b) by 171 days.

(21) Appl. No.: 13/985,904

(22) PCT Filed: Nov. 2, 2011

(86) PCT No.: PCT/CN2011/081696
§ 371 (c)(1),
(2), (4) Date: Aug. 16, 2013

(87) PCT Pub. No.: WO2012/109922
PCT Pub. Date: Aug. 23, 2012

(65) Prior Publication Data
US 2013/0324119 A1    Dec. 5, 2013

(30) Foreign Application Priority Data

Feb. 17, 2011 (CN) .......................... 2011 1 0042309
Mar. 7, 2011  (CN) .......................... 2011 1 0053815

(51) Int. Cl.
H04W 36/00 (2009.01)
H04W 24/10 (2009.01)

(52) U.S. Cl.
CPC .......... *H04W 36/0094* (2013.01); *H04W 24/10* (2013.01)

(58) Field of Classification Search
None
See application file for complete search history.

(56) References Cited

U.S. PATENT DOCUMENTS

2006/0153133 A1* 7/2006 Zhong ........................... 370/331
2009/0264130 A1* 10/2009 Catovic et al. ................. 455/436
2011/0130144 A1* 6/2011 Schein et al. .................. 455/442

(Continued)

FOREIGN PATENT DOCUMENTS

CN       19992970 A    7/2007
CN       101064898 A   10/2007

(Continued)

OTHER PUBLICATIONS

3GPP TS 36.300 V9.3.0, dated Mar. 2010.*
3GPP TS 37.320 V1.0.0, dated Aug. 2010.*

(Continued)

*Primary Examiner* — Daniel Lai
(74) *Attorney, Agent, or Firm* — Cantor Colburn LLP

(57) ABSTRACT

The disclosure provides a method, device and system for controlling UE to take measurements, the method comprising: a radio network controller sending an ANR measurement configuration message to UE, wherein the information carries the maximum time that the UE is to take ANR measurements; the UE receiving the ANR measurement configuration message, taking the ANR measurements, timing a measurement period, and storing the measurement results; when the measurement period reaches the maximum time, the UE deleting the ANR measurement configuration message. The disclosure solves the problem of lack of specific procedure about whether UE needs to continue taking measurements and how the measurements should be taken when there is no qualified information after a long period of measurement, thereby preventing the UE from constantly being in a measurement mode, and saving resources.

18 Claims, 5 Drawing Sheets

(56) References Cited

U.S. PATENT DOCUMENTS

2012/0009918 A1* 1/2012 Wu .............................. 455/423
2012/0092998 A1* 4/2012 Chang et al. ................. 370/241

FOREIGN PATENT DOCUMENTS

| CN | 101594631 A | 12/2009 |
|---|---|---|
| CN | 101932042 A | 12/2010 |

OTHER PUBLICATIONS

LTE Network Infrastructure and Elements by LTE Encyclopedia, archived on Jan. 4, 2011.*
International Search Report issued Feb. 9, 2012; regarding PCT/CN2011/081696; citing: CN 101594631 A, CN 101932042 A, CN 19932042 A and CN 101064898 A.

* cited by examiner

METHOD, DEVICE AND SYSTEM FOR CONTROLLING UE TO TAKE MEASUREMENTS

TECHNICAL FIELD

The disclosure relates to the field of communications, and particularly, to a method, device and system for controlling User Equipment (UE) to take measurements.

BACKGROUND

Ensuring service continuity of a mobile user is a basic function of a cellular mobile communication system, and handover of a serving cell of a mobile station is main means of ensuring the service continuity. In order to facilitate handover of UE (User Equipment), the system needs to configure neighboring relationship for each cell, so that the network side notifies the user equipment of neighbor cell information. The user equipment measures neighbor cells according to the neighbor cell information and then reports a measurement result. The network side then instructs the user equipment to hand over to a certain neighbor cell according to the reported measurement result.

Which neighbor cells are around a certain cell is not only related to a cell distance, but also closely related to a wireless environment where the cell is. Because the wireless environment is complicated, it is very difficult to determine exactly which neighbor cells should be configured to a certain cell at the beginning of network planning, especially in a city environment with dense high buildings. Some other situations will cause that the neighbor cell information is not updated in time, for example, one cell is newly added in the system or an attribute of a cell changes, but the neighboring relationship of the cell is not updated in time, or there is change of environment or omission of a network planner. Thus, the user equipment will not be able to hand over to another cell in time, and the following situations may occur: the load of the current cell will be too high, the signal quality of the current cell becomes worse, the interference is serious or user call drops may occur, and so on. Hence, an ANR (Automatic Neighboring Relationship Function) task is introduced in the 3GPP (3rd Generation partnership project) conference, and the flow is substantively as follows: sending ANR measurement configuration message to UE; the UE takes ANR measurements and stores the information; the network side sends to the UE an ANR request notification to the UE when the network side needs the UE to perform reporting; and the UE reports a measurement result. However, there is still no specific procedure about whether UE needs to continue taking measurements and how the measurements should be taken when there is no qualified information after a long period of measurement.

With respect the problem of lack of specific procedure about whether UE needs to continue taking measurements and how the measurements should be taken when there is no qualified information after a long period of measurement, no effective solution is proposed currently.

SUMMARY

The disclosure provides a method, device and system for controlling UE to take measurements, so as to solve the problem of lack of specific procedure about whether UE needs to continue taking measurements and how the measurements should be taken when there is no qualified information after a long period of measurement.

According to an aspect of the disclosure, a method for controlling UE to take measurements is provided, including: a radio network controller sending an Automatic Neighboring Relationship Function (ANR) measurement configuration message to UE, wherein the ANR measurement configuration message carries the maximum time that the UE is to take ANR measurements; the UE receiving the ANR measurement configuration message, taking the ANR measurements, timing a measurement period, and storing measurement results; and when the measurement period reaches the maximum time, the UE deleting the ANR measurement configuration message.

Preferably, after the UE receives the ANR measurement configuration message, takes the ANR measurements, times the measurement period, and stores the measurement results and before the UE deletes the ANR measurement configuration message, the method further includes: the UE reporting the measurement results that are obtained to the radio network controller.

Preferably, after the UE reports the measurement results that are obtained to the radio network controller, the method further includes: the radio network controller updating neighboring configuration according to the measurement results.

Preferably, the radio network controller updating the neighboring configuration according to the measurement results includes: the radio network controller parsing the measurement results, and configuring a cell as a neighboring cell if the number of times reporting cell information about the cell included in the measurement results reaches a preset number of times.

Preferably, after the radio network controller updates the neighboring configuration according to the measurement results, the method further includes: other UE in a current cell handing over to another cell, the signal of which is better than that of the current cell, according to the updated neighboring configuration.

Preferably, the ANR measurement configuration message further includes: a physical quantity to be measured.

Preferably, the physical quantity to be measured includes at least one of the following: Common Pilot Channel Energy per chip Noise Ratio, Common Pilot Channel Received Signal Code Power, Primary Common Control Physical Channel Received Signal Code Power, Timeslot Interference on Signal Code Power Pathloss.

Preferably, after the UE deletes the ANR measurement configuration message, the method further includes: when the radio network controller determines that the radio network controller needs the UE to take the ANR measurements again, the radio network controller sending an ANR measurement configuration message again to the UE, wherein the ANR measurement configuration message sent again carries the maximum time that the UE is to take the ANR measurements this time.

Preferably, after the UE stores the measurement results, the method further includes: the UE periodically reporting the measurement results according to a measurement reporting manner of periodical reporting instructed by the radio network controller, wherein the measurement reporting manner of periodical reporting instructed by the radio network controller to the UE is carried in the ANR measurement configuration message.

Preferably, the way in which the radio network controller instructs the measurement reporting manner of periodical reporting to the UE includes: carrying an information cell, the value of which is periodical reporting, in the ANR measurement configuration message and carrying an information cell which includes the length of a reporting period; or carrying an information cell which includes the length of a reporting period in the ANR measurement configuration message.

Preferably, the measurement results are carried and reported in an additional measurement report or a radio resource control (RRC) message, wherein the RRC message includes one of the following: an initial direct transmission message, a measurement report, a radio network control connection request message, an uplink direct transmission message, a cell update message.

According to another aspect of the disclosure, a system for controlling user equipment (UE) to take measurements is provided, including a radio network controller and UE, wherein the radio network controller is configured to send an Automatic Neighboring Relationship Function (ANR) measurement configuration message to the UE, wherein the ANR measurement configuration message carries the maximum time that the UE is to take ANR measurements; the UE is configured to receive the ANR measurement configuration message, take the ANR measurements, time a measurement period, and store measurement results; and delete the ANR measurement configuration message when the measurement period reaches the maximum time.

Preferably, the UE is further configured to report the measurement results that are obtained to the radio network controller.

Preferably, the radio network controller is further configured to update neighboring configuration according to the measurement results.

Preferably, the radio network controller is further configured to parse the measurement results, and configure a cell as a neighboring cell if the number of times reporting cell information about the cell in the measurement results reaches a preset number of times.

Preferably, the system further includes other UE in a current cell, wherein said other UE is configured to hand over to another cell, the signal of which is better than that of the current cell, according to the updated neighboring configuration.

Preferably, the radio network controller is further configured to send an ANR measurement configuration message again to the UE when determining that the radio network controller needs the UE to take the ANR measurements again, wherein the ANR measurement configuration message sent again carries the maximum time that the UE is to take ANR measurements this time.

Preferably, the UE is further configured to periodically report the measurement results according to a measurement reporting manner of periodical reporting instructed by the radio network controller, wherein the measurement reporting manner of periodical reporting instructed by the radio network controller to the UE is carried in the ANR measurement configuration message.

According to still another aspect of the disclosure, a radio network controller is provided, including: a generation module, configured to generate an Automatic Neighboring Relationship Function (ANR) measurement configuration message, wherein the ANR measurement configuration message carries the maximum time that UE is to take ANR measurements; and a sending module, configured to send the ANR measurement configuration message to the UE.

According to still another aspect of the disclosure, user equipment is provided, including: a receiving module, configured to receive an Automatic Neighboring Relationship Function (ANR) measurement configuration message sent from a radio network controller, take ANR measurements, time a measurement period, and store measurement results, wherein the ANR measurement configuration message carries the maximum time that the UE is to take the ANR measurements; and a deletion module, configured to, when the measurement period reaches the maximum time, delete the ANR measurement configuration message.

In the embodiments of the disclosure, UE receives an ANR measurement configuration message, takes ANR measurements and times a measurement period, when there is no qualified information after a long period of measurement of the UE, i.e. the measurement period reaches the maximum time, the UE deletes the stored measurement results and ANR measurement configuration message and ends this measurement, thereby preventing the UE from being in a measurement mode all the time and avoiding waste of resources.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

It is mentioned in related art that an ANR task is introduced in the 3 GPP conference, and the flow is substantively as follows: sending ANR measurement configuration message to UE; the UE takes ANR measurements and stores the information; the network side sends to the UE an ANR request notification to the UE when the network side needs the UE to perform reporting; and the UE reports a measurement result. However, there is still no specific procedure about whether UE needs to continue taking measurements and how the measurements should be taken when there is no qualified information after a long period of measurement.

Figure 1:
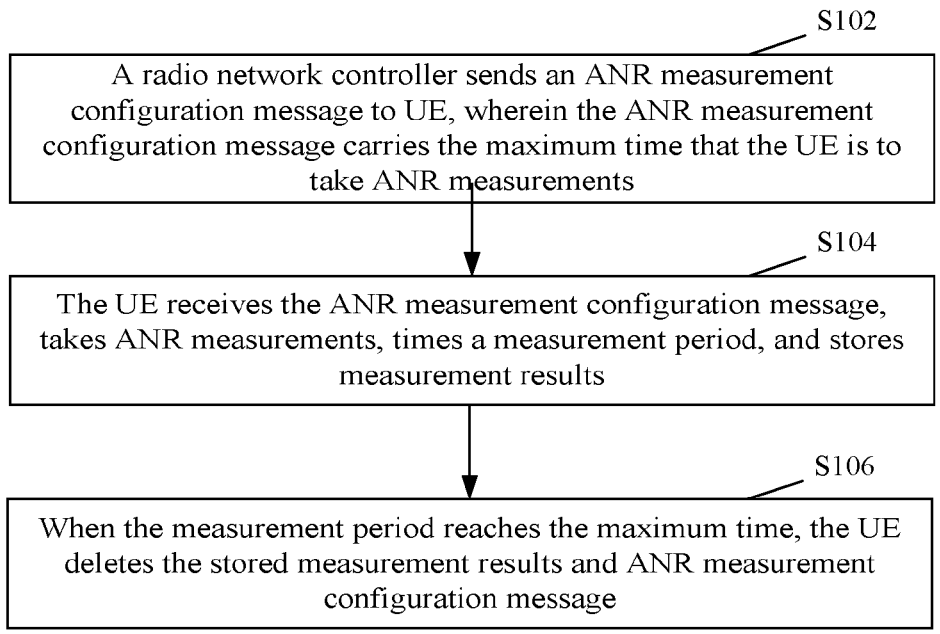
FIG. 1 is a first processing flowchart of a method for controlling UE to take measurements according to an embodiment of the disclosure.

In order to solve the above-mentioned technical problem, an embodiment of the disclosure provide a method for controlling UE to take measurements, the processing flow of which is as shown in FIG. 1 and includes:

Step S102, a radio network controller sends an ANR measurement configuration message to UE, wherein the ANR measurement configuration message carries the maximum time that the UE is to take ANR measurements;

Step S104: the UE receives the ANR measurement configuration message, takes the ANR measurements, times a measurement period, and stores measurement results; and Step S106: when the measurement period reaches the maximum time, the UE deletes the stored measurement results and ANR measurement configuration message.

In the embodiment of the disclosure, the UE receives the ANR measurement configuration message, takes the ANR measurements and times the measurement period, when there is no qualified information after a long period of measurement of the UE, i.e. the measurement period reaches the maximum time, the UE deletes the stored measurement results and ANR measurement configuration message, and ends this measurement, thereby preventing the UE from being in measurement mode all the time and avoiding waste of resources.

In the flow as shown in FIG. 1, after the implementation of Step S104, i.e. after the UE receives the ANR measurement configuration message, takes the ANR measurements, times the measurement period and stores the measurement results, and before the implementation of Step S106, i.e. before the UE deletes the stored measurement results and ANR measurement configuration message, the following operation may also be carried out: the UE reports the obtained measurement results to the radio network controller.

Preferably, the radio network controller is capable of updating neighboring configuration according to the measurement results reported by the UE, selects a cell with better signals, and deletes a cell with worse signals. For example, a preferred configuration update manner can be as follows: the radio network controller parses the obtained measurement results, and configures a cell as a neighboring cell if the number of times reporting cell information about this cell included in the measurement results reaches a preset number of times, such as three times, five times, ten times or other numbered times. Likewise, if cell information about a cell is seldom reported, the cell can be substituted by a cell with a greater number of reporting times.

After the radio network controller updates the neighboring configuration according to the measurement results, other UE in the current cell can hand over to another cell, the signal of which is better than that of the current cell, according to the updated neighboring configuration. In this way, the user equipment hands over to another cell in time, avoiding the occurrence of overload of the current cell, signal quality of the current cell becoming worse, severe interference or call drop of the user and so on.

During implementation, the ANR measurement configuration message may further include other parameters according to different measurement environments or other different conditions, such as a physical quantity to be measured. The physical quantity to be measured may include at least one of the following: Common Pilot Channel Energy per chip Noise Ratio (CPICH Ec/N0), and/or Common Pilot Channel Received Signal Code Power (CPICH RSCP), and/or Primary Common Control Physical Channel Received Signal Code Power (CCPCH RSCP), and/or Timeslot Interference on Signal Code Power (ISCP) Pathloss and so on.

In the flow as shown in FIG. 1, during the implementation of Step S106, a timer can be used to time the maximum time judge whether the maximum time has arrived, i.e. the ANR measurements of the UE are taken according to the following steps.

When the user equipment takes the ANR measurements, after receiving the ANR measurement configuration message, the timer is started up, and the duration of the timer is set as the maximum time that the UE is to take measurements in the configuration information.

The UE measures the physical quantity to be measured contained in the notification message and stores the measurement results.

Figure 2:
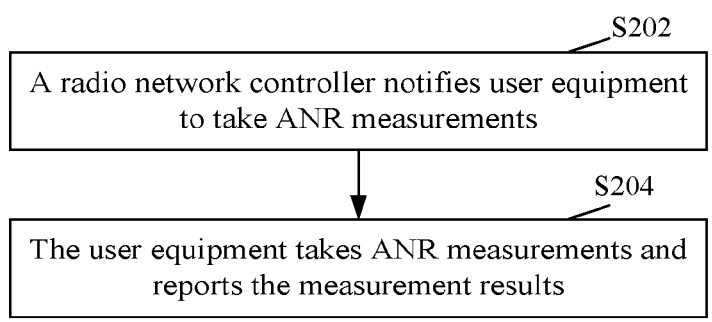
FIG. 2 is a second processing flowchart of a method for controlling UE to take measurements according to an embodiment of the disclosure.

In order to illustrate the method for controlling UE to take measurements provided by the embodiment of the disclosure more clear, this method will be described from another perspective, and the processing flow is as shown in FIG. 2, which includes the following steps.

Step S202: a radio network controller sends an ANR measurement configuration message to user equipment.

In this step, the radio network controller (RNC) may carry the maximum time that the UE is to take measurements in the ANR measurement configuration message and notify the UE to take ANR measurements.

Preferably, the ANR measurement configuration message may also contain a physical quantity to be measured.

The above-mentioned physical quantity to be measured may include: Common Pilot Channel Energy per chip Noise Ratio (CPICH Ec/N0), and/or Common Pilot Channel Received Signal Code Power (CPICH RSCP), and/or Primary Common Control Physical Channel Received Signal Code Power (CCPCH RSCP), and/or Timeslot Interference on Signal Code Power (ISCP) Pathloss and so on.

Step S204: after receiving the ANR measurement configuration message, the user equipment takes the ANR measurements and stores the measurement results.

When the UE takes the ANR measurements, the step specifically includes: after receiving the ANR measurement configuration message, a timer is started up, the duration of the timer is set as the maximum time that the UE is to take measurements in the configuration information; and the UE measures the physical quantity to be measured contained in the notification message and stores the measurement results.

When receiving an ANR request message sent from the network side, the UE reports the measurement results and clears the stored measurement results. Or, when the timer has timed out, the user equipment reports the measurement results and clears the stored measurement results, and stops the measurement. If the radio network controller needs the UE to take the ANR measurements again, the radio network controller has to send an ANR measurement configuration message again.

Figure 3:
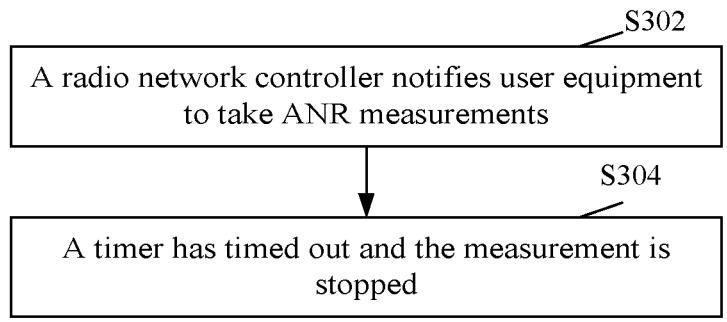
FIG. 3 is a third processing flowchart of a method for controlling UE to take measurements according to an embodiment of the disclosure.

FIG. 3 is a flowchart of a method for controlling UE to take measurements and reporting from a third perspective in an embodiment of the disclosure, which includes the following steps.

Step S302: a radio network controller sends an ANR measurement configuration message to user equipment.

In this step, the radio network controller (RNC) may carry the maximum time that the UE is to take measurements in the ANR measurement configuration message and notify the user equipment to take ANR measurements.

Preferably, a physical quantity to be measured is also contained in the notification message.

The above-mentioned physical quantity to be measured may include: Common Pilot Channel Energy per chip Noise Ratio (CPICH Ec/N0), and/or Common Pilot Channel Received Signal Code Power (CPICH RSCP), and/or Primary Common Control Physical Channel Received Signal Code Power (CCPCH RSCP), and/or Timeslot Interference on Signal Code Power (ISCP) Pathloss and so on;

Step S304: after the user equipment receives the notification message, the timer is started up, the duration of the timer is set as the maximum time that the UE is to take measurements in the configuration information; and the UE measures the physical quantity to be measured contained in the notification message, and if there is still no qualified measurement result being saved, when the timer has timed out, the user equipment directly stops taking measurements.

If the radio network controller needs the UE to take ANR measurements again, the radio network controller has to send ANR measurement configuration message again.

Figure 4:
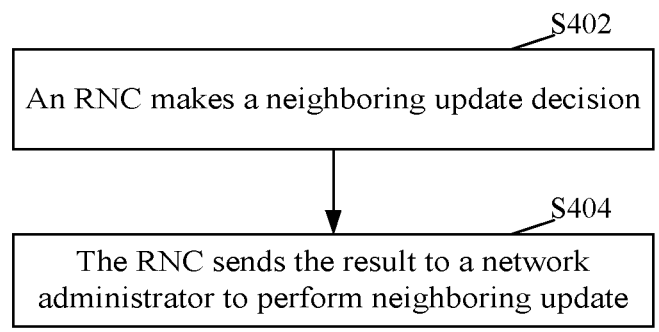
FIG. 4 is a schematic flowchart of a first embodiment of a method for controlling UE to take measurements according to an embodiment of the disclosure.

FIG. 4 is a schematic flowchart of a first embodiment of a radio network controller receiving an ANR measurement report reported by UE in the disclosure, and as shown in FIG. 4, the flow includes the following steps.

Step S402: the RNC receives the ANR measurement report from the UE and makes a neighboring update decision.

The decision method is as follows: collecting statistics according to the cell information in the ANR measurement report of the UE, and if the reported cell information has accumulated to a certain number of times, then this cell is configured as a neighboring cell.

Step S404: the RNC sends the result to a network administrator, and the neighboring cell is updated automatically.

Figure 5:
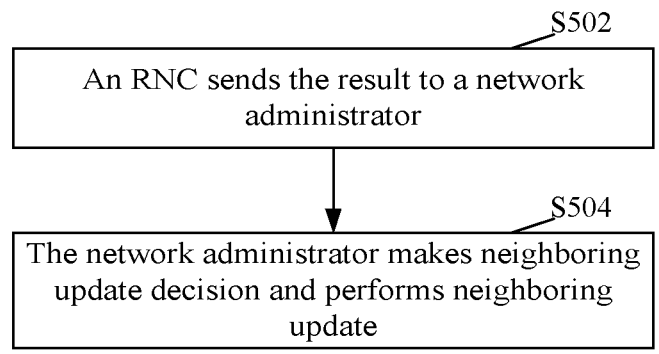
FIG. 5 is a schematic flowchart of a second embodiment of a method for controlling UE to take measurements according to an embodiment of the disclosure.

FIG. 5 is a schematic flowchart of a second embodiment of a radio network controller receiving an ANR measurement report reported by UE in the disclosure, and as shown in FIG. 5, the flow includes the following steps.

Step S502: the RNC receives the ANR measurement report from the UE and sends the result to a network administrator.

Step S504: the network administrator makes a neighboring update decision and performs update automatically.

The decision method is as follows: collecting statistics according to the result sent from the RNC, and if the reported cell information has accumulated to a certain number of times, then this cell is configured as a neighboring cell.

In the embodiment of the disclosure, after the UE deletes the stored measurement results and ANR measurement configuration message, when the radio network controller determines that the radio network controller needs the UE to take the ANR measurements again, the radio network controller sends an ANR measurement configuration message to the UE again, wherein the ANR measurement configuration message sent again carries the maximum time that the UE is to take the ANR measurements this time.

It can be seen from the technical solution provided by the above-mentioned embodiments of the disclosure that the radio network controller notifies the user equipment to take ANR measurements and the user equipment takes ANR measurements and reports the measurement results. By way of the solution provided in the embodiments of the disclosure, the user equipment notifies the network side of the measurement results after having taken the ANR measurements, which improves the learning capability of the network side to the neighboring information about the user equipment. The network side updates neighboring cells according to the measurement results reported by the user equipment and uses an updated neighboring list when sending a measurement control message to user equipment which does not meet this measurement solution, which ensures that relevant user equipment hands over to a preferred cell in time and ensures the session continuity of the user equipment.

Figure 6:
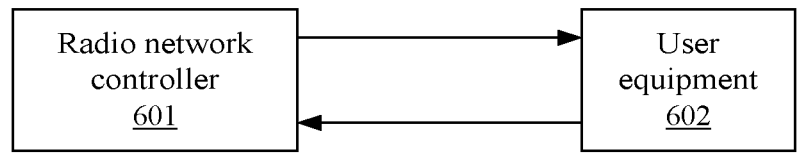
FIG. 6 is a structural schematic diagram of a system for controlling UE to take measurements according to an embodiment of the disclosure.

As regards the method in the embodiments of the disclosure, a system for controlling UE 602 to take measurements is also provided. As shown in FIG. 6, the system at least includes a radio network controller 601 and user equipment 602, wherein the radio network controller 601 is configured to send an ANR measurement configuration message to the user equipment 602 and notify the user equipment 602 to take ANR measurements; and the user equipment 602 is configured to receive the notification from the radio network controller 601, take the ANR measurements and report measurement results.

The radio network controller 601 may also be configured to carry the maximum time that the UE 602 is to take measurements in the ANR measurement configuration message.

The radio network controller 601 may also be configured to carry a physical quantity to be measured in the notification message.

The user equipment 602 may also be configured to receive the ANR measurement configuration message from the radio network controller 601 and measure the physical quantity to be measured contained therein; and configured to stop taking measurements when the timer has timed out and report the stored measurement results.

The radio network controller 601 can also be configured to update neighboring information maintained by the system according to the measurement results reported by the user equipment 602.

Based on the same inventive concept, an embodiment of the disclosure also provides another system for controlling UE 602 to take measurements, the structural schematic diagram of which is as shown in FIG. 6, including a radio network controller 601 and UE 602, wherein the radio network controller 601 is configured to send an ANR measurement configuration message to the UE 602, wherein the ANR measurement configuration message carries the maximum time that the UE 602 is to take ANR measurements;

the UE 602 is configured to receive the ANR measurement configuration message, take the ANR measurements, time a measurement period, and store the measurement results; and configured to delete the ANR measurement configuration message when the measurement period reaches the maximum time.

In one embodiment, preferably, the UE 602 may also be configured to report the obtained measurement results to the radio network controller 601.

In one embodiment, preferably, the radio network controller 601 may also be configured to update neighboring configuration according to the measurement results.

In one embodiment, preferably, the radio network controller 601 may be further configured to parse the measurement results, and configure a cell as a neighbor if the number of times reporting cell information about this cell in the measurement results reaches a preset number of times.

In one embodiment, preferably, the above-mentioned system further includes other UE in the current cell which is configured to hand over to another cell, the signal of which is better than that of the current cell, according to the updated neighboring configuration.

In one embodiment, preferably, the radio network controller 601 may be further configured to send an ANR measurement configuration message again to the UE 602 when determining that the radio network controller 601 needs the UE 602 to take ANR measurements again, wherein the ANR measurement configuration message sent again carries the maximum time that the UE is to take ANR measurements this time.

Figure 7:
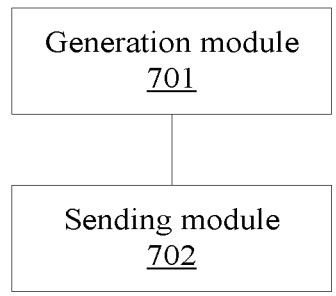
FIG. 7 is a structural schematic diagram of a radio controller according to an embodiment of the disclosure.

Based on the same inventive concept, an embodiment of the disclosure also provides a radio network controller, the structure of which is as shown in FIG. 7, including:

a generation module 701, configured to generate an ANR measurement configuration message, wherein the ANR measurement configuration message carries the maximum time that UE is to take ANR measurements;

a sending module 702, configured to send the ANR measurement configuration message to the UE.

Figure 8:
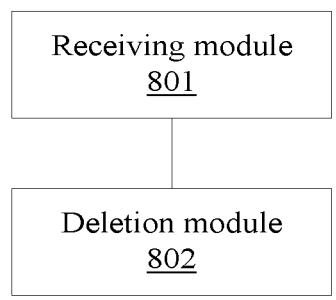
FIG. 8 is a structural schematic diagram of user equipment according to an embodiment of the disclosure.

Based on the same inventive concept, an embodiment of the disclosure also provides UE, the structure of which is as shown in FIG. 8, including:

a receiving module 801, configured to receive an ANR measurement configuration message sent from a radio network controller, take ANR measurements, time a measurement period, and store measurement results, wherein the ANR measurement configuration message carries the maximum time that the UE is to take the ANR measurements; and a deletion module 802, configured to, when the measurement period reaches the maximum time, delete the stored measurement results and ANR measurement configuration message.

Figure 9:
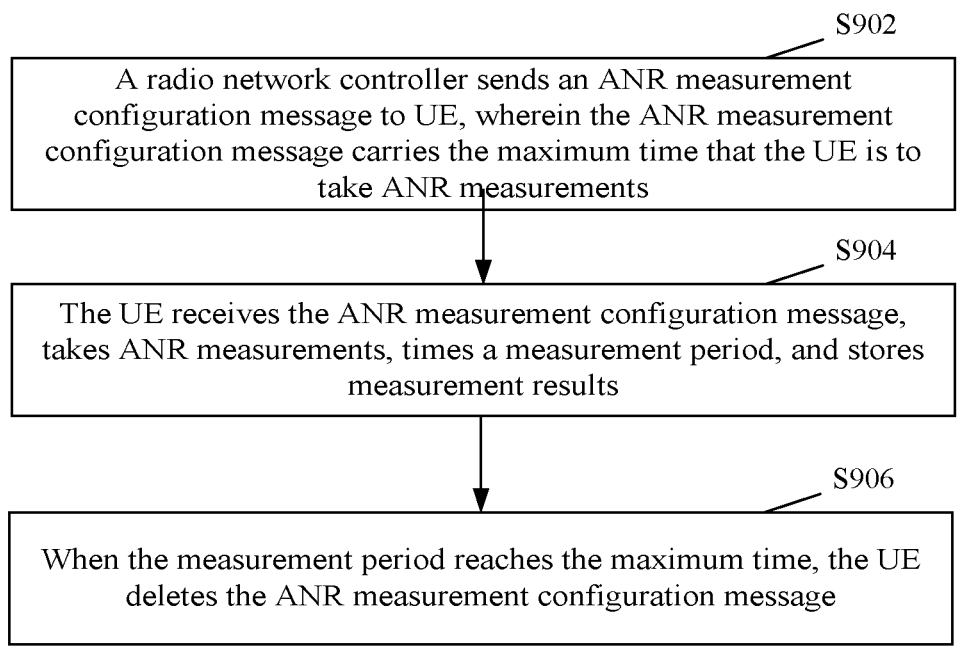
FIG. 9 is a fourth processing flowchart of a method for controlling UE to take measurements according to an embodiment of the disclosure.

FIG. 9 is a fourth processing flowchart of a method for controlling UE to take measurements according to an embodiment of the disclosure, which specifically includes the following steps:

Step S902, a radio network controller sends an ANR measurement configuration message to UE, wherein the ANR measurement configuration message carries the maximum time that the UE is to take ANR measurements;

Step S904: the UE receives the ANR measurement configuration message, takes ANR measurements, times a measurement period, and stores measurement results; and Step S906, the UE deletes the ANR measurement configuration message when the measurement period reaches the maximum time.

Figure 10:
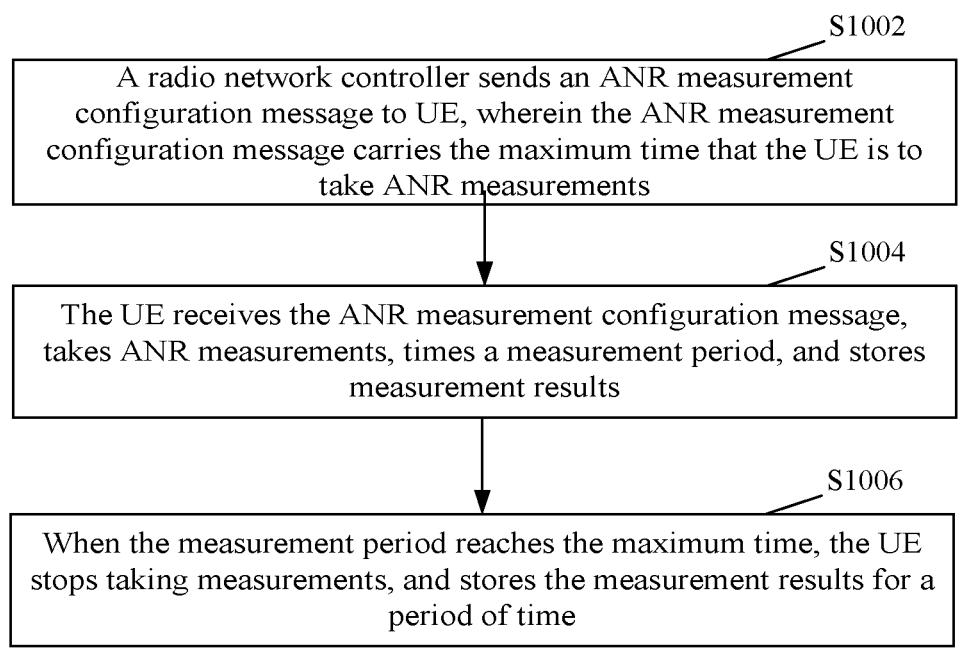
FIG. 10 is a fifth processing flowchart of a method for controlling UE to take measurements according to an embodiment of the disclosure.

FIG. 10 is a fifth processing flowchart of a method for controlling UE to take measurements according to an embodiment of the disclosure, which specifically includes the following steps:

Step S1002, a radio network controller sends an ANR measurement configuration message to UE, wherein the ANR measurement configuration message carries the maximum time that the UE is to take ANR measurements;

Step S1004: the UE receives the ANR measurement configuration message, takes the ANR measurements, times a measurement period, and stores measurement results; and Step S1006, when the measurement period reaches the maximum time, the UE stops taking measurements, and the measurement results are stored for a period of time, such as 48 hours.

During implementation, there can be many implementations for the UE to report the measurement results after storing the same. For example, the measurement results may be reported instantly, the measurement results may also be reported at random intervals or regular intervals, and preferably, the manner of periodical reporting can be employed and a proper period length is selected so as to be able to accurately acquire the measurement result. During implementation, the radio controller carries the measurement reporting manner which instructs the UE to perform periodical reporting in ANR measurement configuration message, and after receiving the ANR measurement configuration message, the UE periodically reports the measurement results according to the measurement reporting manner of periodical reporting instructed by the radio controller.

The way in which the radio network controller instructs the measurement reporting manner of periodical reporting to the UE includes: an information cell, the value of which is periodical reporting, is carried in the ANR measurement configuration message and an information cell which includes the length of the reporting period is carried in the ANR measurement configuration message; or an information cell which includes the reporting period is carried in the ANR measurement configuration message. The length of the interval between two times of measurement result reporting by the UE is the length of a preset reporting period.

During implementation, the measurement results are carried and reported in an additional measurement report or a radio resource control (RRC) message, wherein the RRC message is one of the following: an initial direct transmission message, a measurement report, a radio network control connection request message, an uplink direct transmission message, a cell update message.

The embodiments of the disclosure can achieve the following beneficial effects: in the embodiments of the disclosure, the UE receives an ANR measurement configuration message, takes ANR measurements and times a measurement period, when there is no qualified information after a long period of measurement of the UE, i.e. the measurement period reaches the maximum time, the UE deletes the stored measurement results and ANR measurement configuration message, and ends this measurement, thereby preventing the UE from being in measurement mode all the time and avoiding waste of resources.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for controlling User Equipment (UE) to take measurements, comprising:

UE receiving an Automatic Neighboring Relationship Function (ANR) measurement configuration message from a radio network controller, wherein the ANR measurement configuration message carries a maximum period that the UE is to take ANR measurements;

the UE taking the ANR measurements, timing a measurement period, and storing measurement results; and when the measurement period reaches the maximum period, the UE deleting the ANR measurement configuration message, wherein after the UE stores the measurement results, the method further comprises: the UE periodically reporting the measurement results according to a measurement reporting manner of periodical reporting instructed by the radio network controller, wherein the measurement reporting manner of periodical reporting instructed by the radio network controller to the UE is carried in the ANR measurement configuration message, wherein the way in which the radio network controller instructs the measurement reporting manner of periodical reporting to the UE comprises: carrying an information cell, the value of which is periodical reporting, in the ANR measurement configuration message and carrying an information cell which comprises the length of a reporting period; or carrying an information cell which comprises the length of a reporting period in the ANR measurement configuration message.

2. The method according to claim 1, wherein after the UE receives the ANR measurement configuration message, takes the ANR measurements, times the measurement period, and stores the measurement results and before the UE deletes the ANR measurement configuration message, the method further comprises: the UE reporting the measurement results that are obtained to the radio network controller.

3. The method according to claim 2, wherein after the UE reports the measurement results that are obtained to the radio network controller, the method further comprises: the radio network controller updating neighboring configuration according to the measurement results.

4. The method according to claim 3, wherein the radio network controller updating the neighboring configuration according to the measurement results comprises: the radio network controller parsing the measurement results, and configuring a cell as a neighboring cell if the number of times reporting cell information about the cell included in the measurement results reaches a preset number of times.

5. The method according to claim 4, wherein after the UE deletes the ANR measurement configuration message, the method further comprises: when the radio network controller determines that the radio network controller needs the UE to take the ANR measurements again, the radio network controller sending an ANR measurement configuration message again to the UE, wherein the ANR measurement configuration message sent again carries the maximum period that the UE is to take the ANR measurements this time.

6. The method according to claim 3, wherein after the radio network controller updates the neighboring configuration according to the measurement results, the method further comprises: other UE in a current cell handing over to another cell, the signal of which is better than that of the current cell, according to the updated neighboring configuration.

7. The method according to claim 3, wherein after the UE deletes the ANR measurement configuration message, the method further comprises: when the radio network controller determines that the radio network controller needs the UE to take the ANR measurements again, the radio network controller sending an ANR measurement configuration message again to the UE, wherein the ANR measurement configuration message sent again carries the maximum period that the UE is to take the ANR measurements this time.

8. The method according to claim 2, wherein after the UE deletes the ANR measurement configuration message, the method further comprises: when the radio network controller determines that the radio network controller needs the UE to take the ANR measurements again, the radio network controller sending an ANR measurement configuration message again to the UE, wherein the ANR measurement configuration message sent again carries the maximum period that the UE is to take the ANR measurements this time.

9. The method according to claim 1, wherein the ANR measurement configuration message further comprises: a physical quantity to be measured.

10. The method according to claim 9, wherein the physical quantity to be measured comprises at least one of the following:

Common Pilot Channel Energy per chip Noise Ratio, Common Pilot Channel Received Signal Code Power, Primary Common Control Physical Channel Received Signal Code Power, Timeslot Interference on Signal Code Power Pathloss.

11. The method according to claim 10, wherein after the UE deletes the ANR measurement configuration message, the method further comprises: when the radio network controller determines that the radio network controller needs the UE to take the ANR measurements again, the radio network controller sending an ANR measurement configuration message again to the UE, wherein the ANR measurement configuration message sent again carries the maximum period that the UE is to take the ANR measurements this time.

12. The method according to claim 9, wherein after the UE deletes the ANR measurement configuration message, the method further comprises: when the radio network controller determines that the radio network controller needs the UE to take the ANR measurements again, the radio network controller sending an ANR measurement configuration message again to the UE, wherein the ANR measurement configuration message sent again carries the maximum period that the UE is to take the ANR measurements this time.

13. The method according to claim 1, wherein after the UE deletes the ANR measurement configuration message, the method further comprises: when the radio network controller determines that the radio network controller needs the UE to take the ANR measurements again, the radio network controller sending an ANR measurement configuration message again to the UE, wherein the ANR measurement configuration message sent again carries the maximum period that the UE is to take the ANR measurements this time.

14. The method according to claim 1, wherein the measurement results are carried and reported in an additional measurement report or a radio resource control (RRC) message, wherein the RRC message comprises one of the following: an initial direct transmission message, a measurement report, a radio network control connection request message, an uplink direct transmission message, a cell update message.

15. A system for controlling user equipment (UE) to take measurements, comprising a radio network controller and UE, wherein the radio network controller is configured to send an Automatic Neighboring Relationship Function (ANR) measurement configuration message to the UE, wherein the ANR measurement configuration message carries a maximum period that the UE is to take ANR measurements and a measurement reporting manner of periodical reporting, wherein the measurement reporting manner of periodical reporting to the UE comprises: carrying an information cell, the value of which is periodical reporting, in the ANR measurement message and carrying an information cell which comprises the length of a reporting period; or carrying an information cell which comprises the length of a reporting period in the ANR measurement configuration message;

the UE is configured to receive the ANR measurement configuration message, take the ANR measurements, time a measurement period, and store measurement results; and periodically report the measurement results according to the measurement reporting manner of periodical reporting instructed by the radio network controller, and delete the ANR measurement configuration message when the measurement period reaches the maximum period.

16. The system according to claim 15, wherein the radio network controller is further configured to send an ANR measurement configuration message again to the UE when determining that the radio network controller needs the UE to take the ANR measurements again, wherein the ANR measurement configuration message sent again carries the maximum period that the UE is to take ANR measurements this time.

17. A radio network controller, comprising:
a generation module, configured to generate an Automatic Neighboring Relationship Function (ANR) measurement configuration message, wherein the ANR measurement configuration message carries a maximum period that UE is to take ANR measurements and a measurement reporting manner of periodical reporting, wherein the measurement reporting manner of periodical reporting further comprises: carrying an information cell, the value of which is periodical reporting, in the ANR measurement configuration message and carrying an information cell which comprises the length of a reporting period; or carrying an information cell which comprises the length of a reporting period in the ANR measurement configuration message; and a sending module, configured to send the ANR measurement configuration message to the UE.

18. A user equipment, comprising:
a receiving module, configured to receive an Automatic Neighboring Relationship Function (ANR) measurement configuration message sent from a radio network controller, take ANR measurements, time a measurement period, and store measurement results, and periodically report the measurement results according to a measurement reporting manner of periodical reporting instructed by the radio network controller, wherein the ANR measurement configuration message carries a maximum period that the UE is to take the ANR measurements and the measurement reporting manner of periodical reporting, wherein the measurement reporting manner of periodical reporting further comprises: carrying an information cell, the value of which is periodical reporting, in the ANR measurement configuration message and carrying an information cell which comprises the length of a reporting period; or carrying an information cell which comprises the length of a reporting period in the ANR measurement configuration message; and a deletion module, configured to, when the measurement period reaches the maximum period, delete the ANR measurement configuration message.

* * * * *